United States Patent
Cunningham et al.

(10) Patent No.: US 9,882,899 B2
(45) Date of Patent: Jan. 30, 2018

(54) REMOTELY AUTHENTICATING A DEVICE

(71) Applicant: HEWLETT-PACKARD DEVELOPMENT COMPANY, L.P., Houston, TX (US)

(72) Inventors: John Cunningham, Leixlip (IE); Jefferson P Ward, Brush Praine, WA (US); Stephen D. Panshin, Corvallis, OR (US); Laurent Pizot, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

(21) Appl. No.: 14/908,030

(22) PCT Filed: Jul. 31, 2013

(86) PCT No.: PCT/US2013/052975
§ 371 (c)(1),
(2) Date: Jan. 27, 2016

(87) PCT Pub. No.: WO2015/016896
PCT Pub. Date: Feb. 5, 2015

(65) Prior Publication Data
US 2016/0164868 A1 Jun. 9, 2016

(51) Int. Cl.
*H04L 29/06* (2006.01)
*H04L 9/08* (2006.01)
(Continued)

(52) U.S. Cl.
CPC ........ *H04L 63/0869* (2013.01); *H04L 9/0877* (2013.01); *H04L 9/14* (2013.01); *H04L 9/3271* (2013.01); *H04L 63/0435* (2013.01)

(58) Field of Classification Search
CPC ............ H04L 63/0869; H04L 63/0435; H04L 63/0428; H04L 9/0861; H04L 9/0894;
(Continued)

(56) References Cited

U.S. PATENT DOCUMENTS 7,221,473 B2 5/2007 Jeran et al.
7,623,255 B2 11/2009 Simpson
(Continued)

FOREIGN PATENT DOCUMENTS

| CN | 102173233 | 9/2011 |
|---|---|---|
| JP | 2008197710 | 8/2008 |
| JP | 2009104485 | 5/2009 |

OTHER PUBLICATIONS

Service for the Aftermarket of the Printer Cartridge Chips, (Web Page), 2003, http://wwww.semiresearch.com/index.php?1200727499.
(Continued)

*Primary Examiner* — Syed Zaidi
(74) *Attorney, Agent, or Firm* — HP Inc. Patent Department

(57) ABSTRACT

Remotely authenticating a device includes generating authentication data and secret key data in a controlled environment, sending the authentication data to a remote authentication engine, and sending the secret key data to a personalization engine to apply the secret key data to a device after sending the authentication data to the remote authentication engine such that the remote authentication engine has an ability to authenticate the device.

21 Claims, 4 Drawing Sheets

(51) Int. Cl.
*H04L 9/14* (2006.01)
*H04L 9/32* (2006.01)

(58) Field of Classification Search
CPC ....... H04L 9/0897; H04L 9/0877; H04L 9/14;
H04L 9/3271
USPC .......................................................... 726/7
See application file for complete search history.

(56) References Cited

U.S. PATENT DOCUMENTS

| | | |
|---|---|---|
| 8,181,223 B2 | 5/2012 | Naota |
| 8,375,212 B2 | 2/2013 | Buck et al. |
| 2003/0149666 A1 | 8/2003 | Davies |
| 2006/0087678 A1* | 4/2006 | Simpson ................. G06F 21/34 |
| | | 358/1.15 |
| 2009/0125715 A1 | 5/2009 | Schuba |
| 2009/0187766 A1* | 7/2009 | Vuillaume .............. G06F 21/33 |
| | | 713/176 |
| 2011/0154043 A1 | 6/2011 | Lim et al. |
| 2012/0134687 A1 | 5/2012 | Jones et al. |

OTHER PUBLICATIONS

Korean Intellectual Property Office, International Search Report dated May 13, 2014 (3 pages).

\* cited by examiner

REMOTELY AUTHENTICATING A DEVICE

BACKGROUND

Authentication is a process of proving or verifying that information is genuine. Authentication processes can use different mechanisms to ensure that the information is genuine. For example, a user identification code and a password may be used to verify that an author is who the author says he is when logging into a website to publish an online article.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Figure 1:
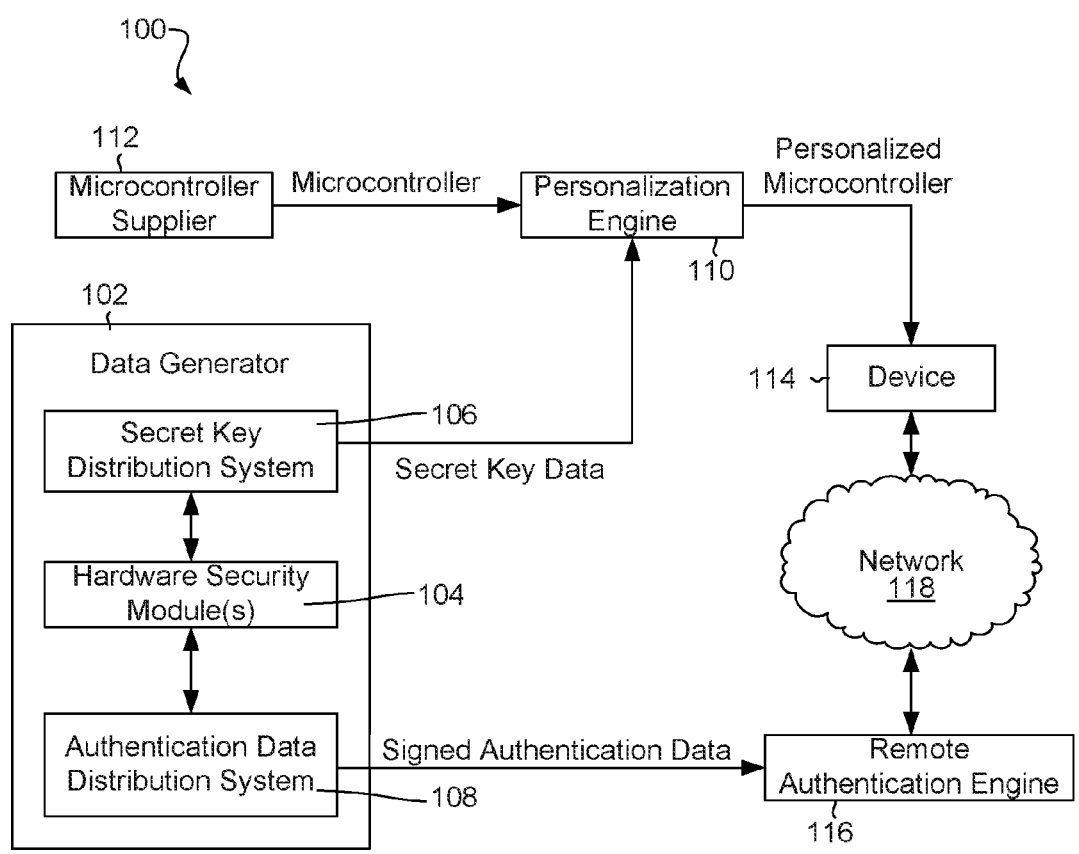
FIG. 1 is a diagram of an example of an authentication system according to the principles described herein.

Authentication can be used in communication between devices. A network node that receives a message from a client will want to prove or verify that the message from the client is in fact really from the client and not a different device that is pretending to be the client. The network node may use an authentication mechanism to have confidence that if the network node acts on the message that network node will not harm the true client. For example, if the network node receives a message from a client that purports to be client A and the message instructs the network node to debit a sum of money from a banking account associated with client A, the network node can authenticate the message to determine whether the message really came from client A.

The principles described herein include printers that can automatically communicate with a remote authentication engine to order ink or other maintenance services without human intervention. In these cases, the remote authentication engine wants to confirm that the printer from which the remote authentication engine received the message is actually the printer that the message is purported to be from. The ability to automatically order ink or other services is open to abuse if the system cannot securely and reliably determine ink usage prior to sending replacement supplies. The system has to have confidence that the printer ordering the services is registered to a customer and is the printer that it purports to be.

The examples described herein include a method for remotely authenticating a device at a low cost. Such a method may include generating authentication data and secret key data in a controlled environment, sending the authentication data to a remote authentication engine, and applying the secret key data to a device such that the remote authentication engine has an ability to authenticate the device.

In examples where the authentication data is generated with symmetric key cryptography, pre-computed challenge data is sent to the remote authentication engine. The remote authentication engine may also receive the expected responses to the challenge data or hashes of the expected responses. The expected responses or hash values are not sent to the device, but are kept secure at the remote authentication engine. The challenge data is stored at the authentication engine or associated components. In response to receiving a request for a service, the authentication engine can issue one of the challenges to the device. The device uses the secret key to generate a response. Each challenge and response pair can be used once. Thus, the device can be authenticated as many times as the number of challenges sent to the authentication engine.

In some examples where the authentication data is generated with asymmetric key cryptography, the authentication engine receives a public key. The authentication engine can generate its own challenge data. The device uses the private key to generate an appropriate response and the authentication engine uses the public key to verify the response. No resources are used to store individual, pre-generated challenge and response data at the authentication engine because the authentication engine can create the challenges and verify the responses on demand. An additional benefit of using asymmetric cryptography is that the number of times that the device can be authenticated with the authentication engine is limitless because the authentication engine can create any appropriate number of challenges.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to an example or similar language means that a particular feature, structure, or characteristic described is included in at least that one example, but not necessarily in other examples.

FIG. 1 is a diagram of an example of an authentication system (100) according to the principles described herein. In this example, a data generator (102) has at least one hardware security module (104) in communication with a secret key distribution system (106) and an authentication data distribution system (108). The secret key distribution system (106) sends the key data to a personalization engine (110), where the key is applied to a microcontroller from a microcontroller supplier (112). The personalized microcontroller is then incorporated into a device (114) by connecting the microcontroller to the device's circuitry. The key is used later during authentication to generate responses to the challenges from the remote authentication engine that can only be created with knowledge of the key.

The authentication data distribution system (108) sends the authentication data to a remote authentication engine (116). The remote authentication engine (116) can authenticate messages from the device (114) remotely based on the key received by the device (114) and the authentication data received by remote authentication engine (116).

The hardware security module (104) generates the authentication data and the secret key data in a controlled environment, such as the data generator (102). The data generator (102) or other types of controlled environments provide a level of trust between the device (114) and the remote authentication engine (116) by controlling the export of keys generated by the hardware security module (104). The controlled environments may be brick and mortar locations with restricted access, and when access is permitted, such access is logged. The controlled environment may also sign the authentication data that is sent to the remote authentication engine (116) to further control who has access to the authentication data.

The hardware security module holds and/or generates keys internally, which may include private keys, public keys and/or symmetric keys. According to some protocols, these keys must be signed, notarized, or otherwise witnesses to be generated. Nearly unlimited quantities of unique symmetric device keys can be derived from a single symmetric root key. While keys could be stored and used on an industry standard server, doing so would expose the keys to observation and theft. For this reason hardware security modules are used to generate and store keys where no human can access them.

In some examples, the authentication data distribution system (108) sends the authentication data to the remote authentication engine (116) before the secret key distribution system (106) sends key data out to the personalization engine. Thus, the remote authentication engine (116) has the authentication data before the device (114) has the secret key data. In this manner, there is proof that the authentication data exists to justify creating a device with the corresponding key data. For example, if the secret key data were first sent to the personalization engine and applied to a device, but the authentication data were not sent to the remote authentication engine, the creation of the device becomes moot.

The authentication data may be sent to the remote authentication engine (116) through any appropriate mechanism. In the example of FIG. 1, the authentication data is sent to the remote authentication engine in a signed format, such as digital signature format. Each time that authentication data is sent to the remote authentication engine, the transmission is verified and recorded for possible future audits. In some examples, the authentication data sent to the remote authentication engine (116) is encrypted, but in other examples, no encryption is used. A third party with knowledge of the authentication data would not have enough information to duplicate the device or to provide valid responses to challenges without the secret key.

In examples where the hardware security module (104) generates symmetric key cryptography, the authentication data sent to the remote authentication engine (116) through the authentication data distribution system (108) may include the one or multiple symmetric key challenges, a hash of the expected responses to the symmetric key challenges, and the unique identifiers of the devices with the symmetric keys. In some examples where symmetric key cryptography is used, a unique secret key is applied to just a single device.

In examples where the hardware security module (104) generates an asymmetric key pair, the authentication data sent to the remote authentication engine (116) through the authentication data distribution system (108) may include the public key and the unique identifiers of the devices that will possess the private key of the asymmetric key pair. In examples where the asymmetric cryptography is used, the private key may be applied to multiple devices.

The authentication data distribution system (108) may not have to implement an encrypted transfer of the authentication data to the remote authentication engine (116). When symmetric key cryptography is used, a third party will not be able to generate the secret key based off of the challenges and the respective response data. Further, a 3$^{rd}$ party cannot generate appropriate responses to the authentication data because only a hash of the expected response is stored at the authentication engine. When asymmetric key cryptography is used, the remote authentication engine just receives a public key. Thus, for security purposes encryption does not have to be implemented. In some examples, transport level encryption is used to validate that the transmission was sent to the real remote authentication engine (116). This is more to safely sanction subsequent manufacturing, thereby reducing the risk of not having authentication data ready in the remote authentication engine (116) for the device (114).

The hardware security module (104) may generate secret key data based on the request of the personalization engine (110). For example, when the personalization engine (110) receives a batch of a hundred microcontrollers from the microcontroller supplier (112), the personalization engine (110) may request secret key data for each of the hundred microcontrollers. The microcontroller supplier (112) may include a microcontroller identifier in each of the microcontrollers. In some examples, the microcontroller identifier is predictable so that the hardware security module (104) can generate secret key data for each microcontroller based on the microcontroller identifiers.

The microcontroller identifier from the supplier can be arbitrary. In this case, the first stage in personalizing the microcontroller is to replace the microcontroller identifier with an identifier from the hardware security modules. If the microcontroller identifiers are predictable, the authentication data can be batch generated ahead of manufacturing. If not, the risks of producing a number of parts for which there will be no authentication data in the remote authentication engine increases. This principle can significantly reduce the cost of production and the risk of producing devices that will not correlate with the authentication data.

In some examples, the secret key distribution system (106) sends the secret key data for multiple microcontrollers at once. In other examples, the secret key distribution system (106) sends secret key data for just a single microcontroller at a time such that the personalization engine holds just the key data specific for the microcontroller that is in the process of being personalized. The secret key distribution system (106) follows a protocol that prevents the secret key data from being discovered during the personalization process.

The personalization engine (110) personalizes the microcontroller by applying the secret key data to the microcontroller. The microcontroller may come from the microcontroller supplier (112) with a pre-personalization key. The pre-personalization key may be replaced with the secret key by the personalization engine.

The personalized microcontrollers are next incorporated into the device (114). The personalized microcontrollers may be incorporated into the device (114) in any appropriate manner. In some examples, the personalized microcontrollers are incorporated into the device's circuitry. While this example has been described with reference to the microcontroller being personalized before incorporation into the device (114), the principles described herein also include examples where the microcontroller is personalized after being incorporated into the device (114).

The device (114) may be in communication with a remote authentication engine (116) through a network (118), such as the internet. For example, the device (114) may be a printer, and the remote authentication engine (116) may be a service that receives orders from the device (114) for replacement ink or orders for other services, such as requests for maintenance. The remote authentication engine (116) may authenticate that the request for a service is actually from the device (114) that the device purports to be. For example, the remote authentication engine (116) may issue a challenge to the device (114) based on the challenge data sent to the remote authentication engine (116). The device (114) may use the secret key applied to the microcontroller to return a response. If the response matches the response expected by the remote authentication engine (116), the remote authentication engine (116) authenticates the device. If the response fails to match an expected response from the device (114), the remote authentication engine (116) will deny authentication.

While this example has been described with reference to the device being a printer, any appropriate type of device may be used in accordance with the principles described herein. For example, the device may be a printer, an automatic teller machine, an order console, a network component, a personal computer, a laptop, a desktop, a watch, a phone, an electronic tablet, a data center component, factory equipment, production equipment, a vehicle, another type of device, or combinations thereof.

While this example has been described with reference to specific types of remote authentication engines, any appropriate type of remote authentication engine may be used in accordance with the principles described herein. For example, the remote authentication engine may be part of a web service that is cloud based. In other examples, the remote authentication engine is connected to the device over a network connection that does not involve connecting to the internet. Further, in some examples, a company may wish to authenticate devices internally. In some examples, communications with the remote authentication device do not have to involve internet protocol addresses; media access control addresses, internet protocols, other standard internet communication mechanisms, or combinations thereof.

While this example has been described with reference to specific types of authentication data, any appropriate type of authentication data may be used in accordance with the principles described herein. In some examples, during an initial authentication session, identifiers, such as device identifiers and microcontroller identifiers, are recorded by the remote authentication engine (116).

Further, the remote authentication engine (116) may understand the type of device (114) and the likely requests that the device (114) will make during the course of the device's lifecycle. For example, a printer may be expected to run out of ink within predetermined time periods. If a message is purporting to be from a printer requesting an ink replacement outside of the predetermined time period, the remote authentication engine (116) may not authenticate the request and not provide the requested service. In some examples, the remote authentication engine (116) also understands the sequence of the types of requests that the device (114) should be making. Thus, if a message purports to be from a specific device, but the message's request calls for a service that falls outside of the predetermined sequence, the remote authentication engine (116) may deny service for failure to authenticate.

Figure 2:
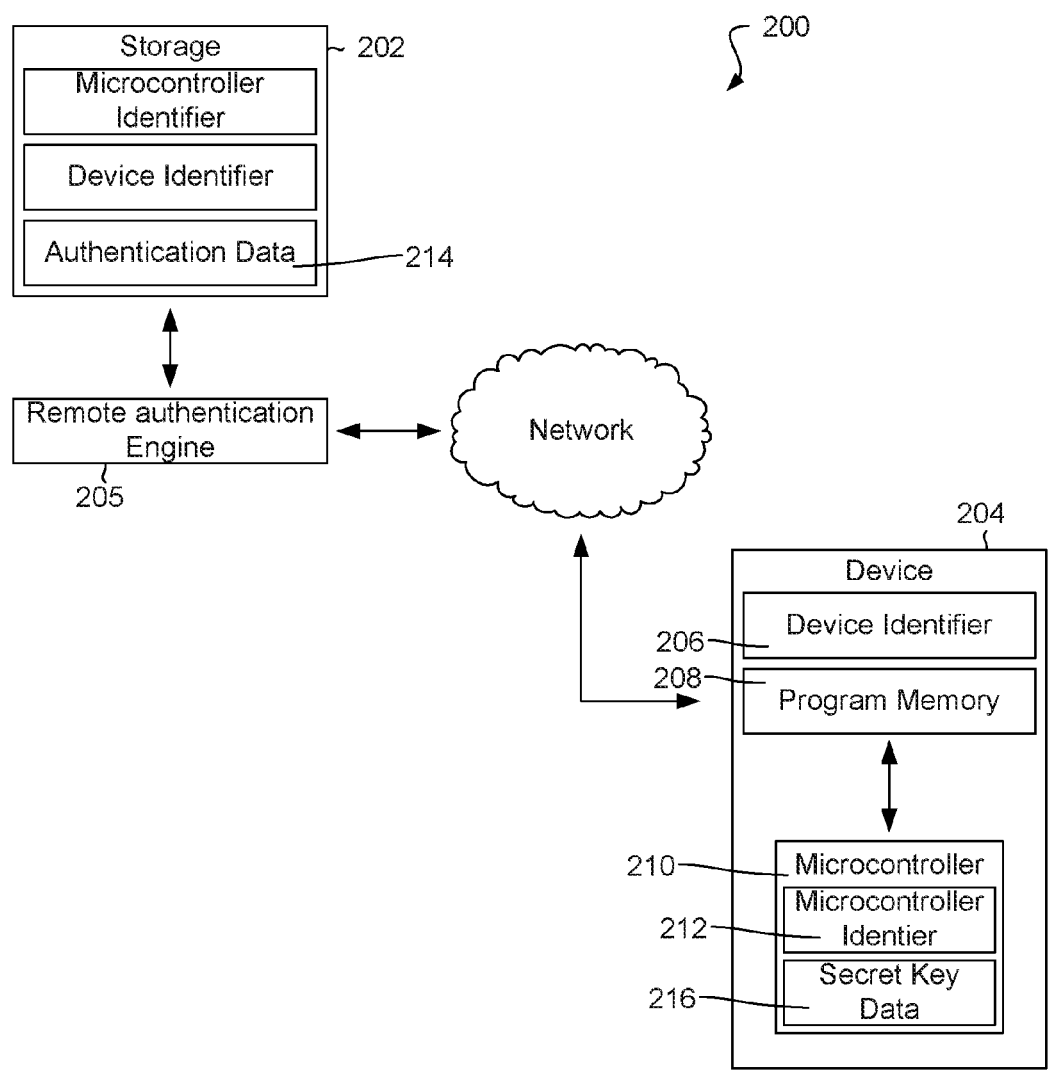
FIG. 2 is a diagram of an example of an authentication system according to the principles described herein.

FIG. 2 is a diagram of an example of an authentication system (200) according to the principles described herein. In this example, a memory based storage (202) holds information about the device (204) at the remote authentication engine (205) or another remote location after the device is authenticated.

The device (204) has its own device identifier (206). The device identifier (206) may be any appropriate type of identification, such as codes, symbols, letter sequences, number sequences, other types of identification, or combinations thereof. The microcontroller (210) also has a microcontroller identifier (212), which is written to the microcontroller during the personalization process.

The remote authentication engine may communicate with the device (204) through program memory (208) which is in communication with the microcontroller (210) that is incorporated into the device's circuitry. The microcontroller identifier (212) may be any appropriate type of identification, such as codes, symbols, letter sequences, number sequences, other types of identification, or combinations thereof. In addition to the microcontroller identifier (212), the microcontroller (210) is provisioned during personalization with the secret key (216) to generate an appropriate response to a request to authenticate from the remote authentication engine.

The device (204) may participate in an authentication session, which is when an authentication protocol is executed, with the remote authentication engine by receiving challenge data from the remote authentication engine or through another mechanism. During the first authentication session, the remote authentication engine may record the device identifier (206) and the microcontroller identifier (212). The remote authentication engine may store the device identifier (206) and the microcontroller identifier (212) in storage (202). The storage (202) may be a local storage or a remote storage that associates the device identifier (206) and the microcontroller identifier (212) with the authentication data (214) received by the remote authentication engine.

Figure 3:
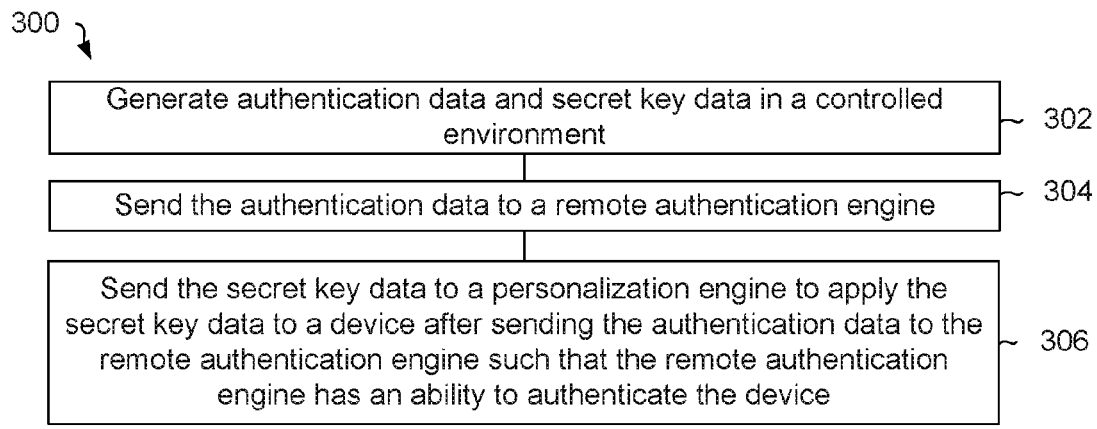
FIG. 3 is a diagram of an example of a method for remotely authenticating a device according to the principles described herein.

FIG. 3 is a diagram of an example of a method (300) for remotely authenticating a device according to the principles described herein. In this example, the method (300) includes generating (302) authentication data and secret key data in a controlled environment, sending (304) the authentication data to a remote authentication engine, and sending (306) the secret key data to a personalization engine to apply the secret key to a device after sending the authentication data to the remote authentication engine such that the remote authentication engine has an ability to authenticate the device.

In some examples, the authentication data includes a public key when asymmetric key cryptography is used, as well as the identifier of the microcontroller that corresponds with the private key. When symmetric key cryptography is used, the challenge data, the hashes of the expected responses, and the microcontrollers identifier are sent to the remote authentication engine. The secret key data may include a symmetric key when symmetric cryptography is used or a private key when asymmetric cryptography is used.

The asymmetric key pair may be used amongst any appropriate arbitrary number of devices. For example, a unique key pair may be used for just one device or for multiple devices. Thus, in some examples, multiple public keys are sent to the remote authentication engine, and the remote authentication engine will include a mechanism for determining which of the public keys to use for device authentication.

The principles described herein may be implemented for the authentication of ink subscription enabled printer devices. These principles may include a microcontroller that has low cost and may be similar to those used in modern credit cards. The microcontroller may be internally attached to the printer during manufacturing. The microcontrollers have a secure configuration with secret keys specifically to support the authentication system. The authentication system may include program instructions that are responsible for generating authentication data for each individual microcontroller. The authentication data contains the information to execute and validate the authentication requests. Further, the principles described herein can include a pre-existing cloud-based data channel to the printer with extensions made to printer program memory and cloud services to support the authentication protocol.

The microcontroller identifier and the device and/or printer identifier can be associated and registered within the remote authentication engine or by a third party when the first authentication is performed. In some examples, the device sends the microcontroller identifier and device identifier to the remote authentication engine every time a challenge/response sequence is used to authenticate the microcontroller. This eliminates having to store records of active devices.

A command sequence can then be delivered to the microcontroller culminating in a response which can be used to authenticate the printer. In some examples, the response to the authentication request can be generated with knowledge of the secured per-microcontroller key, and the authentication request can just be used for this device once and at the expected time to guard against replay attacks.

A key-discovery attack in the authentication system is mitigated by using unique keys and by registering each microcontroller and its associated printer on first use when symmetric key cryptography is used. These two factors and the physical security of the microcontroller itself ensure this type of threat remains economically unviable. The microcontroller is relatively low cost. Further, the microcontrollers contain proprietary program instructions which allows for the secure execution of commands, which have access to the secret key and utilize industry-standard cryptographic functions. The command sequence allows for remote authentication without having to consult with the hardware security modules during authentication. This reduces the cost and complexity of the authentication service implementation, while also increasing performance and reliability as there are fewer potential points of failure. Thus, the keys within the microcontrollers do not have to be shared with the authentication service.

Asymmetric key cryptography allows for the use of non-unique keys, and the impact of a key discovery may be greater than when symmetric key cryptography is used. The cost is greater on the asymmetric side when generating the authentication data and also depends upon the ratio of the number of key pairs to the number of devices.

Each microcontroller has a unique identifier and an associated unique key for symmetric cryptography. In some examples, the unique key may comprise a 128-bit value. The microcontrollers have predictable identifiers which allows for pre-generation of the authentication data sent to the remote authentication engine. A protocol may be used to securely transfer unique keys generated within the hardware security modules to the microcontrollers during the personalization process such that there is no possibility of key discovery.

The same type of hardware security modules used to personalize the microcontrollers in manufacturing may be used in the generation of the authentication data. The hardware security modules are connected to secure servers. The combination of the secure server and the hardware security modules produce the challenge data and the hash of the expected response pairs that are each uniquely identified in sequence for a particular microcontroller.

The principles described herein ensure that the authentication data is always available before the authentication data is requested by the customer. Thus, the authentication data is sent to the remote authentication engine before the personalization engine applies the secret key data to the microcontrollers. In some examples, the authentication system does not sanction personalization of microcontrollers until the authentication data has been delivered to the remote authentication engine. The authentication data can be transferred with any appropriate mechanism. In one example, the authentication data is sent to the remote authentication engine in digitally signed blocks through a remote authentication engine application program interface and all transactions are verified and recorded for audit. In such an example, the authentication data is constructed such that it does not have to be encrypted to be secure. Sending the authentication data in a secure format prevents the authentication data from being used maliciously to mount a large-scale attack.

An authentication service within the remote authentication engine can determine from the microcontroller the next challenge and/or request to issue, and by using the authentication data can construct the appropriate commands. The microcontroller will accept just those authorized commands. For example, the microcontroller may permanently disable itself after a fixed number of failed attempts. At the end of the command sequence, a response is returned from the authentication service from which authentication may be ascertained and reported.

The principles described herein can securely authenticate the device while having the ability to regenerate the authentication data at any point in the future to minimize customer disruption due to data corruption. Further, the authentication data is secure such that even large scale loss cannot allow an economically viable attack. Also, the authentication system ensures that the data is ready for the customer before the customer can use the data. Any appropriate type of microcontroller can be used with the principles described herein such as secure microcontrollers used in credit cards, set-top boxes, etc.

Figure 4:
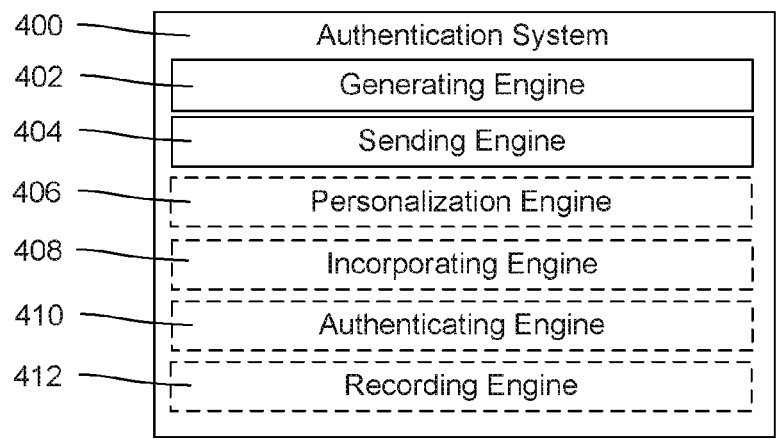
FIG. 4 is a diagram of an example of an authentication system according to the principles described herein.

FIG. 4 is a diagram of an example of an authentication system (400) according to the principles described herein. The authentication system (400) includes a generating engine (402) and a sending engine (404). In this example, the authentication system (400) includes a personalization engine (406), an incorporating engine (408), an authenticating engine (410), and a recording engine (412). The engines (402, 404, 406, 408, 410, 412) refer to a combination of hardware and program instructions to perform a designated function. Each of the engines (402, 404, 406, 408, 410, 412) may include a processor and memory. The program instructions are stored in the memory and cause the processor to execute the designated function of the engine.

The generating engine (402) generates the authentication data and the secret key data. The sending engine (404) sends the appropriate authentication data to the remote authentication engine and the secret key data to the personalization engine. In those examples where the authentication data includes a symmetric key, the symmetric key is sent to the device and the challenge data and the hashes of the expected responses are sent to the remote authentication engine. In other examples where the authentication data includes an asymmetric key pair, the private key of the key pair is sent to the device and the public key of the key pair is sent to the remote authentication engine. Further, an identifier of the microcontroller may also be sent to the remote authentication engine regardless of the type of cryptography used.

The personalization engine (406) personalizes the microcontroller by applying the secret key data to the microcontroller. The incorporating engine (408) incorporates the microcontroller into the device. in some examples, the incorporating engine (408) incorporates the microcontroller into the device by hardwiring the microcontroller to the device's circuitry. In other examples, the incorporating engine (408) positions the microcontroller such that the microcontroller is in wireless communication with the device's circuitry.

The authenticating engine (410) may authenticate the device in response to a request from the device, such as a request for a service like a request for a replacement part. The authenticating engine (410) uses the challenge data and the response data to authenticate the device. The recording engine (412) records data from the device during an initial authenticating session with the device. For example, the recording engine (412) may record device identifiers, microcontroller identifiers, other data, or combinations thereof.

Figure 5:
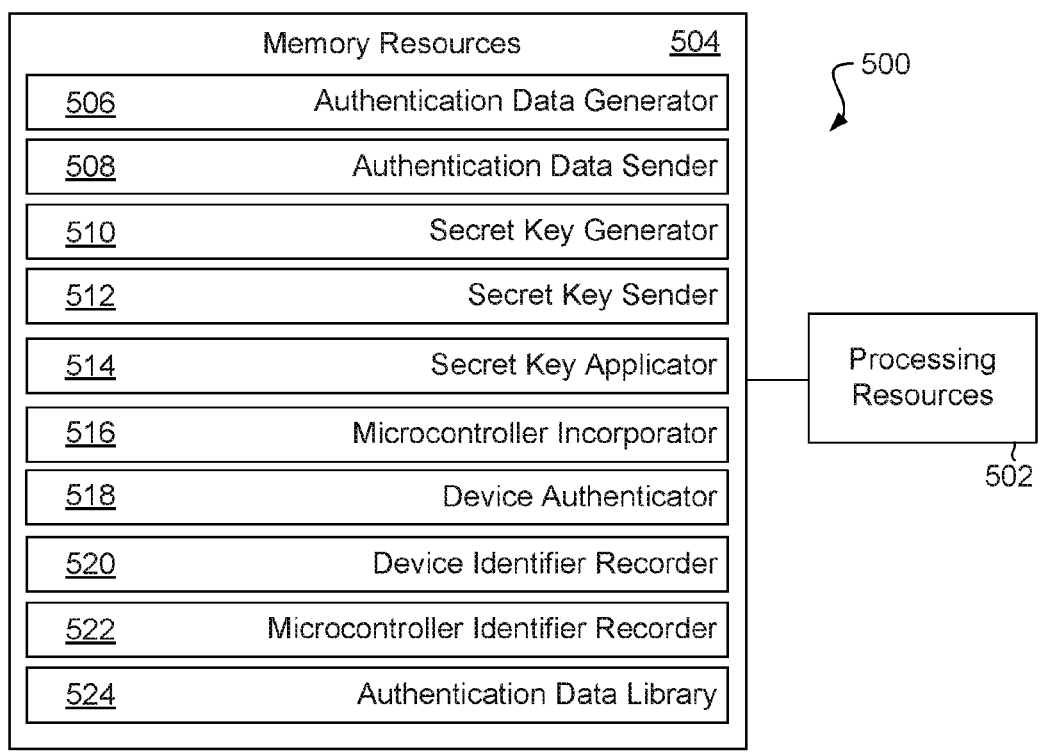
FIG. 5 is a diagram of an example of an authentication system according to the principles described herein.

FIG. 5 is a diagram of an example of an authentication system (500) according to the principles described herein. In this example, the authentication system (500) includes processing resources (502) that are in communication with, memory resources (504). Processing resources (502) include at least one processor and other resources used to process programmed instructions. The memory resources (504) represent generally any memory capable of storing data such as programmed instructions or data structures used by the authentication system (500). The programmed instructions shown stored in the memory resources (504) include an authentication data generator (506), an authentication data sender (508), a secret key generator (510), a secret key sender (512), a secret key applicator (514), a microcontroller incorporator (516), a device authenticator (518), a device identifier recorder (520), and a microcontroller identifier recorder (522). The data structures shown stored in the memory resources (504) include an authentication data library (524).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The authentication data generator (506) represents programmed instructions that, when executed, cause the processing resources (502) to generate authentication data, such as public keys, challenge data, response data, hashes of the response data, or combinations thereof. The authentication data generator (506) may use the predictable microcontroller identifiers to generate authentication data specific for each of the microcontrollers. The authentication data sender (508) represents programmed instructions that, when executed, cause the processing resources (502) to send the authentication data to the remote authentication engine.

The secret key generator (510) represents programmed instructions that, when executed, cause the processing resources (502) to generate a secret key, such as a private key or a symmetric key. The secret key sender (508) represents programmed instructions that, when executed, cause the processing resources (502) to send the secret key to the secret key applicator (514).

The secret key applicator (514) represents programmed instructions that, when executed, cause the processing resources (502) to apply the secret key to the microcontroller. The microcontroller incorporator (516) represents programmed instructions that, when executed, cause the processing resources (502) to incorporate the microcontroller into the device. For example, the microcontroller incorporator (516) may connect the microcontroller to the device's circuitry.

The device authenticator (518) represents programmed instructions that, when executed, cause the processing resources (502) to authenticate the device. The device authenticator (518) may authenticate the device in response to an authentication request from an external host or remote authentication engine. The authentication request may include any appropriate challenge for the device. For example, the authentication request may be an implicit request to authenticate when the device sends a message to the remote authentication engine requesting a service.

The device identifier recorder (520) represents programmed instructions that, when executed, cause the processing resources (502) to record the device identifier during the initial authentication session between the remote authentication engine and the device. The microcontroller identifier recorder (522) represents programmed instructions that, when executed, cause the processing resources (502) to record the microcontroller identifier during the initial authentication session between the remote authentication engine and the device. The authentication data library (524) may associate the authentication data, the microcontroller identifier, and the device identifier that were recorded during the initial authentication session with one another.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs. CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries may be accessed from a remote location over a network connection while the programmed instructions are located locally. Thus, the authentication system (500) may be implemented on a user device, on a server, on a collection of servers, or combinations thereof.

While the examples above have been described with reference to specific authentication data, any appropriate type of authentication data may be used in accordance with the principles described herein. For example, the authentication data may include symmetric keys, asymmetric key pairs, other types of keys, other types of authentication data, or combinations thereof. Also, while the examples above have been described with reference to specific types of remote authentication engines, any appropriate type of remote authentication engine may be used in accordance with the principles described herein. Further, while the examples above have been described with reference to specific devices, any appropriate type of device may be used.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for remotely authenticating a device, comprising:
generating, by a security module, authentication data and secret key data in a controlled environment;
sending the authentication data to a remote authentication engine; and
after sending the authentication data to the remote authentication engine, sending the secret key data to a personalization engine, separate from the remote authentication engine, to apply the secret key data to a device by the personalization engine, the secret key data used by the device to generate a response to an authentication challenge from the remote authentication engine, the response to authenticate the device by the remote authentication engine.

2. The method of claim 1, wherein applying the secret key data to the device includes applying the secret key data to an authentication microcontroller of the device.

3. The method of claim 2, further comprising incorporating the authentication microcontroller into circuitry of the device either before or after the secret key data has been applied to the authentication microcontroller.

4. The method of claim 1, wherein sending the authentication data to the remote authentication engine includes sending the authentication data in a signed format.

5. The method of claim 1, wherein the device is a printer.

6. The method of claim 1, wherein the secret key data includes a symmetric key.

7. The method of claim 1, wherein the authentication data includes a challenge data and an expected response to an authentication challenge.

8. The method of claim 1, further comprising recording a device identifier from the device and a microcontroller identifier of a microcontroller incorporated into the device during an initial authentication session.

9. The method of claim 1, wherein the generating of the secret key data by the security module is in response to a request for the secret key data from the personalization engine.

10. The method of claim 9, wherein the request for the secret key data from the personalization engine is responsive to receipt of a microcontroller by the personalization engine, the receipt of the microcontroller by the personalization engine to trigger the personalization engine to generate the request for the secret key data.

11. An authentication system for remotely authenticating a device, comprising:
a processor; and
a non-transitory storage medium storing instructions executable on the processor to:
receive authentication data generated by a security module that is remote from the authentication system, the security module to further generate secret key data that is sent to a personalization engine, separate from the authentication system, after the authentication data is sent to the authentication system such that the authentication system has the authentication data before the device has the secret key data, the personalization engine to apply the secret key data to the device;
send, to the device, an authentication challenge based on the authentication data; and
receive, from the device, a response to the authentication challenge, the response generated by the device based on the secret key data applied by the personalization engine to the device.

12. The authentication system of claim 11, wherein the response is received from the device that includes a microcontroller to which the secret key data is applied.

13. The authentication system of claim 11, wherein the authentication data includes a public key.

14. The authentication system of claim 11, wherein the secret key data includes a private key.

15. The authentication system of claim 11, wherein the authentication data includes challenge data and an expected response to an authentication challenge, and the secret key data includes a symmetric key.

16. The authentication system of claim 11, wherein the instructions are executable on the processor to further:
receive, from the device, a request for a service,
wherein the sending of the authentication challenge to the device is responsive to the request for the service.

17. The authentication system of claim 16, wherein the device comprises a printer, and the request for the service is a request for replacement ink.

18. The authentication system of claim 16, wherein the instructions are executable on the processor to further:
verify the response from the device; and
grant the request in response to verifying the response from the device.

19. The authentication system of claim 18, wherein the instructions are executable on the processor to further:
determine whether the request is for the service within a specified time window or whether the request is within a specified sequence of requests,
wherein the granting of the request is further in response to determining that the request is for the service within the specified time window or the request is within the specified sequence of requests.

20. A non-transitory computer readable storage medium, comprising computer readable instructions that, when executed, cause a system to:
generate a symmetric key;
send the symmetric key to a personalization engine to be incorporated into a printer; and
send challenge data and an expected response to a remote authentication engine to authenticate the printer remotely in response to a service request, wherein the sending of the symmetric key to the personalization engine occurs after the sending of the challenge data to the remote authentication engine, and wherein the personalization engine is separate from the remote authentication engine, and the symmetric key is for use by the printer to generate a response to an authentication challenge from the remote authentication engine.

21. The non-transitory computer readable storage medium of claim 20, wherein the computer readable instructions when executed cause the system to:
receive a request for the symmetric key from the personalization engine, wherein the generating of the symmetric key is responsive to the request for the symmetric key from the personalization engine.

* * * * *

UNITED STATES PATENT AND TRADEMARK OFFICE
CERTIFICATE OF CORRECTION

PATENT NO. : 9,882,899 B2
APPLICATION NO. : 14/908030
DATED : January 30, 2018
INVENTOR(S) : John Cunningham et al.

Page 1 of 1

It is certified that error appears in the above-identified patent and that said Letters Patent is hereby corrected as shown below:

On the Title Page

In item (72), Inventors, in Column 1, Line 2, delete "Brush Praine," and insert -- Brush Prairie --, therefor.

In the Drawings

In Fig. 2, sheet 2 of 4, reference numeral 212, Line 2, delete "Identier" and insert -- Identifier --, therefor.

Signed and Sealed this
Twenty-sixth Day of November, 2019

Andrei Iancu
*Director of the United States Patent and Trademark Office*